(12) United States Patent
Choi et al.

(10) Patent No.: US 10,338,717 B2
(45) Date of Patent: *Jul. 2, 2019

(54) LIQUID CRYSTAL DISPLAY DEVICE

(71) Applicant: LG DISPLAY CO., LTD., Seoul (KR)

(72) Inventors: Seong-Wook Choi, Chilgok-gun (KR); Hyun-Gi Shin, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,681

(22) Filed: Dec. 17, 2018

(65) Prior Publication Data

US 2019/0121480 A1 Apr. 25, 2019

Related U.S. Application Data

(63) Continuation of application No. 15/380,528, filed on Dec. 15, 2016, now Pat. No. 10,191,575.

(30) Foreign Application Priority Data

Dec. 31, 2015 (KR) .................. 10-2015-0191618

(51) Int. Cl.
*G06F 3/041* (2006.01)
*G02F 1/1333* (2006.01)
*G02F 1/1368* (2006.01)
*G02F 1/1362* (2006.01)
*G06F 3/044* (2006.01)
*G02F 1/1343* (2006.01)

(52) U.S. Cl.
CPC .......... *G06F 3/0412* (2013.01); *G02F 1/1368* (2013.01); *G02F 1/13338* (2013.01); *G02F 1/13624* (2013.01); *G02F 1/136227* (2013.01); *G06F 3/044* (2013.01); *G02F 1/134309* (2013.01); *G02F 1/136286* (2013.01); *G02F 2001/134345* (2013.01)

(58) Field of Classification Search
CPC .... G06F 3/0412; G06F 3/044; G02F 1/13338; G02F 1/136227; G02F 1/13624; G02F 1/1368; G02F 1/134309; G02F 1/136286; G02F 2001/134345
See application file for complete search history.

(56) References Cited

U.S. PATENT DOCUMENTS

2012/0313881 A1* 12/2012 Ge ................... G02F 1/13338
345/174
2013/0155024 A1* 6/2013 Chung ................ G06F 3/0412
345/175

* cited by examiner

*Primary Examiner* — Lisa S Landis
(74) *Attorney, Agent, or Firm* — Dentons US LLP (57) ABSTRACT

The present disclosure describes a liquid crystal display device including: a substrate including first and second touch blocks adjacent to each other, the first and second touch blocks including first and second sub-pixels, respectively; a first electrode in each of the first and second sub-pixels; a second electrode in each of the first and second touch blocks, such that the second electrode of the first touch block and the second electrode of the second touch block are separated from each other; first and second data lines disposed at side portions of the first and second sub-pixels, respectively; and a field blocking line between the first and second sub-pixels, wherein the first and second sub-pixels face into each other between the first and second touch blocks.

20 Claims, 7 Drawing Sheets

LIQUID CRYSTAL DISPLAY DEVICE

CROSS-REFERENCE TO RELATED APPLICATION

This application is a Continuation of U.S. patent application Ser. No. 15/380,528, filed on Dec. 15, 2016, now allowed, which claims the benefit of Korean Patent Application No. 10-2015-0191618, filed on Dec. 31, 2015, which is incorporated by reference in its entirety as if fully set forth herein.

BACKGROUND

1. Technical Field

The present disclosure relates to a liquid crystal display device, including an in-cell touch type liquid crystal display device where deterioration in display quality is prevented.

2. Discussion of the Related Art

Recently, liquid crystal display (LCD) devices have been researched and developed as a next generation display device which has relatively low power consumption, excellent portability, and a high added value. Among various LCD devices, an active matrix LCD device, which has a thin film transistor (TFT) as a switching element adjusting ON and OFF position of each pixel has been the subject of recent research because of its enhanced resolution and an ability to display moving images.

LCD devices include a liquid crystal panel, which displays an image. The liquid crystal panel may be driven by an inversion driving method to prevent deterioration of a liquid crystal layer and improve The quality of the displayed image. The inversion driving method may be classified as a frame inversion type, a line inversion type and a dot inversion type according to the unit that inverts the polarity of light.

In addition, the LCD device includes a gate driving part for driving a plurality of gate lines and a data driving part for driving a plurality of data lines. As the size and resolution of the LCD device increase, a number of integrated circuits (ICs) form the gate driving part and the data driving part.

Because the IC for the data driving part has a higher cost compared to other elements of the LCD device, various methods for decreasing production costs have been researched and developed, such as reducing the number of ICs. For example, a double rate driving (DRD) method has been suggested. In the DRD method, the number of the ICs is halved, but the resolution is maintained by doubling the number of gate lines and halving the number of data lines.

LCD devices may be applied to various products, such as a television, a projector, a mobile phone and a personal digital assistant (PDA). These products may include a touch functionality such that these products may be operated by touching a display panel.

An LCD device having touch functionality integrated therein may be referred to as an in-cell touch type LCD device. The in-cell touch type LCD device includes a plurality of touch blocks for sensing a touch and a plurality of touch lines connected to the plurality of touch blocks as well as a gate line and a data line.

The in-cell touch type LCD device displays an image by applying a common voltage to a common electrode during a display period and uses the common electrode as a touch electrode for sensing a touch of a user during a non-display period.

In addition, when a user touches a display region with a finger, a touch capacitance is generated between the common electrodes separated by the touch block. The in-cell touch type LCD device detects a touch position of the user by comparing the touch capacitance generated by the touch of the user with a reference touch capacitance.

However, in the in-cell touch type LCD device, a phenomenon such as light leakage may occur at a border region between the touch blocks, because the common electrodes are separated by the touch block.

When one of the adjacent touch blocks is touched, a voltage difference is generated between the common electrode of the touch block which is touched and the common electrode of the other touch blocks which are not touched. Thus, even in a black state, light leakage may occur at the border region between the touch blocks, because the liquid crystal molecules in the border region are driven by an electric field generated by the voltage difference.

SUMMARY

Exemplary embodiments of the present disclosure relate to an in-cell touch type liquid crystal display device. One such exemplary embodiment is directed to an in-cell touch type liquid crystal display device that substantially obviates one or more of the problems due to limitations and disadvantages of the related art. Another exemplary embodiment is an in-cell touch type liquid crystal display device having an enhanced display quality because light leakage is prevented.

Advantages and features of the disclosure will be set forth, in part, in the following description, and, in part, will become apparent to those having ordinary skill in the art upon examination of the present disclosure or may be learned from practice of the invention. Other advantages and features of the embodiments herein may be realized and attained by the structure particularly pointed out in the written description and claims hereof as well as the appended drawings, but are not limited thereto.

In one exemplary aspect, a liquid crystal display device comprises a substrate including first and second touch blocks adjacent to each other, the first and second touch blocks including first and second sub-pixels, respectively; a first electrode in each of the first and second sub-pixels; a second electrode in each of the first and second touch blocks, wherein the second electrode of the first touch block and the second electrode of the second touch block are separated from each other; first and second data lines disposed at side portions of the first and second sub-pixels, respectively; and a field blocking line between the first and second sub-pixels, wherein the first and second sub-pixels face in the same direction, and are disposed between the first and second touch blocks.

In another exemplary aspect, the first and second sub-pixels are disposed between the first and second data lines.

In another exemplary aspect, a voltage applied to the field blocking line is different from a voltage applied to the first and second data lines.

In another exemplary aspect, a voltage applied to the field blocking line is a same as a voltage applied to the second electrode.

In another exemplary aspect, the field blocking line includes a layer, which is the same as a layer of the first and second data lines.

In another exemplary aspect, the second electrode comprises: a finger part having a shape of a plurality of bars and overlapping with the first electrode; a connecting part connected to both ends of the finger part; and an opening part separating the connecting part between the first and second sub-pixels.

In another exemplary aspect, the field blocking line overlaps with the opening part of the second electrode.

In another exemplary aspect, the second electrodes of the first and second sub-pixels are connected.

In another exemplary aspect, the field blocking line overlaps with the connecting part of the second electrode.

In another exemplary aspect, the device further comprises a touch line parallel to the first and second data lines and disposed in each of the first and second touch blocks.

In another exemplary aspect, the touch line is electrically connected to the second electrode.

In another exemplary aspect, a common voltage is applied to the second electrode during a display period such that an image is displayed.

In another exemplary aspect, the second electrode is used as a touch electrode during a non-display period such that a touch is sensed.

In another exemplary aspect, the device further comprises first and second thin film transistors disposed in the first and second sub-pixels, respectively.

In another exemplary aspect, a drain electrode of the first thin film transistor is connected to the first electrode of the first sub-pixel through a first drain contact hole, and a drain electrode of the second thin film transistor is connected to the first electrode of the second sub-pixel through a second drain contact hole.

It is to be understood that both the foregoing general description and the following detailed description are exemplary and explanatory, and are intended to provide further explanation of the invention as claimed, and the present disclosure is not limited thereto.

BRIEF DESCRIPTION OF THE DRAWINGS

The accompanying drawings, which are included to provide a further understanding of the present disclosure, are incorporated in, and constitute a part of, this specification, and illustrate various exemplary embodiments, and together with the description, serve to explain the principles of the invention.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud the gist of the invention, the detailed description thereof will be omitted. The described progression of processing steps and/or operations described is exemplary; however, the sequence of steps and/or operations is not limited to those set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Advantages and features of the present invention, and implementation methods thereof will be clarified by the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present application to those skilled in the art. The present invention is only defined by the scope of any appended claims.

A shape, a size, a ratio, an angle, and a number disclosed in the drawings for describing embodiments of the present disclosure are merely exemplary, and thus, the present invention is not limited to the illustrated details. Like reference numerals refer to like elements throughout. In the following description, when the detailed description of relevant known functions or configurations are determined to unnecessarily obscure the important points of the present disclosure, the detailed description will be omitted. The terms 'comprise', 'have', and 'include' in the present specification may include additional parts unless the term 'only-' is also used with such terms. The terms of a singular form may include plural forms unless referred to the contrary.

In construing an element, an error range may be included even if no explicit description regarding the same in included in the specification.

In describing a position relationship, for example, when a position relation between two parts is described as 'on~', 'over~', 'under~', or 'next~', one or more parts may be disposed between the two parts unless the term 'just' or 'direct' is also used with such terms.

In describing a time relationship, for example, when the temporal order is described as 'after~', 'subsequent~', 'next~', or 'before~', a case which is not continuous may be included unless the term 'just' or 'direct' is also used with such terms.

Although the terms "first", "second", etc. may be used herein to describe various elements, these elements are not be limited by these terms. These terms are only used to distinguish one element from another. For example, a first element could, alternatively, be termed a second element, and, similarly, a second element could, alternatively, be termed a first element, without departing from the scope of the present disclosure.

Features of various embodiments of the present disclosure may be partially or completely coupled to, or combined with, each other, and may be variously inter-operated with each other and driven technically as those skilled in the art can sufficiently understand. Further, the embodiments of the present disclosure may be carried out independently from each other, or may be carried out together in co-dependent relationship.

Hereinafter, various embodiments of the present disclosure will be described in detail with reference to the accompanying drawings.

Figure 1:
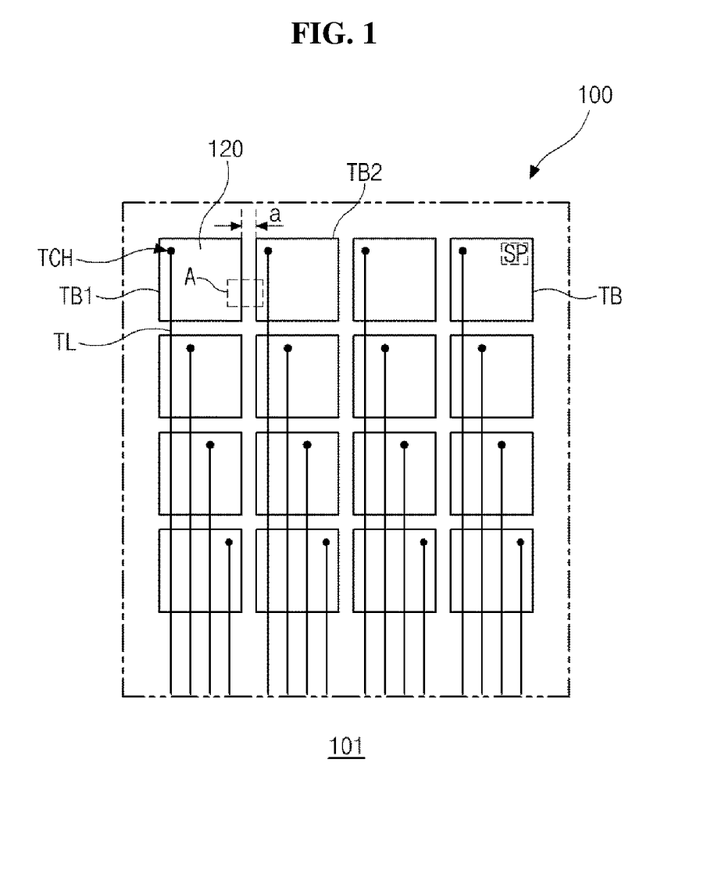
FIG. 1 is a plan view illustrating a liquid crystal display device according to a first embodiment of the present disclosure.

FIG. 1 is a plan view illustrating a liquid crystal display device according to a first embodiment of the present disclosure.

In FIG. 1, a liquid crystal display (LCD) device 100 according to the first embodiment of the present disclosure includes a substrate 101 having a plurality of touch blocks TB, a second electrode 120 in each of the plurality of touch blocks TB and a plurality of touch lines TL disposed along a direction. Each of the plurality of touch blocks TB includes a plurality of sub-pixels SP, and the plurality of touch lines TL are disposed under the second electrode 120. The LCD device 100 has at least first and second touch blocks TB1 and TB2, respectively, position apart from each other by a distance "a".

At least one of the plurality of touch lines TL is connected to one second electrode 120 in each touch block TB, and a change in a capacitance of the second electrode 120 in each touch block TB is transmitted to a sensing circuit (not shown) through the plurality of touch lines TL. The touch line TL is connected to the second electrode 120 in one touch block TB through a touch contact hole TCH and is not connected to the second electrode 120 in the other touch blocks.

Figure 2:
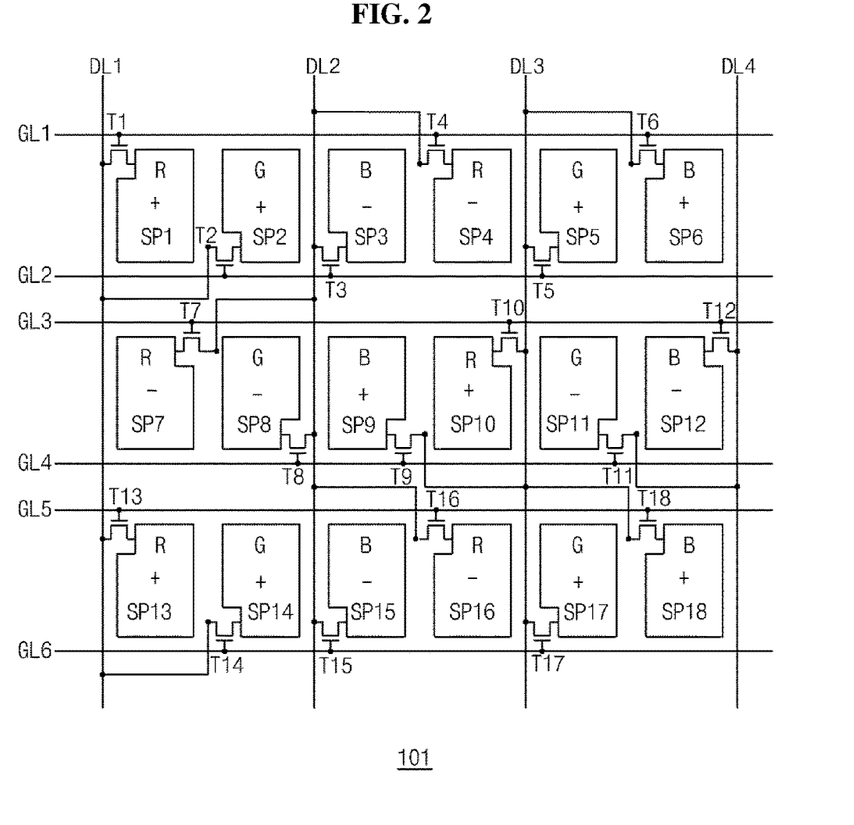
FIG. 2 is a circuit diagram illustrating the circuitry of the liquid crystal display device illustrated in FIG. 1.

FIG. 2 is a circuit diagram illustrating the circuitry of the liquid crystal display device illustrated in FIG. 1.

In FIG. 2, a liquid crystal display (LCD) device includes a substrate 101, first to eighteenth sub-pixels SP1 to SP18 arranged in three rows and six columns, first to sixth gate lines GL1 to GL6, first to fourth data lines DL1 to DL4 and first to eighteenth thin film transistors (TFTs) T1 to T18. The first to eighteenth sub-pixels SP1 to SP18 displays one of red, green and blue colors (R, G and B), and the three adjacent sub-pixels displaying red, green and blue colors (R, G and B) constitute one unit pixel.

Although the first to eighteenth sub-pixels SP1 to SP18 arranged in three rows and six columns are shown in FIG. 2, the present disclosure is not limited thereto, and a plurality of sub-pixels may be arranged in any number of rows and columns.

The first and second gate lines GL1 and GL2 are disposed at upper and lower portions, respectively, of the first to sixth sub-pixels SP1 to SP6 in the first row; the third and fourth gate lines GL3 and GL4 are disposed at upper and lower portions, respectively, of the seventh to twelfth sub-pixels SP7 to SP12 in the second row; and the fifth and sixth gate lines GL5 and GL6 are disposed at upper and lower portions, respectively, of the thirteenth to eighteenth sub-pixels SP13 to SP18 in the third row.

The first to fourth data lines DL1 to DL4 cross the first to sixth gate lines GL1 to GL6. The first data line DL1 is disposed at a left portion of the first, seventh and thirteenth sub-pixels SP1, SP7 and SP13 in the first column, the second data line DL2 is disposed between the second, eighteenth and fourteenth sub-pixels SP2, SP8 and SP14 in the second column and the third, ninth and fifteenth sub-pixels SP3, SP9 and SP15 in the third column, the third data line DL3 is disposed between the fourth, tenth and sixteenth sub-pixels SP4, SP10 and SP16 in the fourth column and the fifth, eleventh and seventeenth sub-pixels SP5, SP11 and SP17 in the fifth column, and the fourth data line DL4 is disposed at a right portion of the sixth, twelfth and eighteenth sub-pixels SP6, SP12 and SP18 in the sixth column.

Each of the three columns of the first to eighteenth sub-pixels SP1 to SP18 are disposed between two of the first to fourth data lines DL1 to DL4, and the two of the first to fourth data lines DL1 to DL4 are alternately connected to the two of the first to eighteenth TFTs T1 to T18 of the corresponding columns of the first to eighteenth sub-pixels SP1 to SP18 therebetween. As a result, the two of the first to fourth data lines DL1 to DL4 are connected in a zigzag pattern along the two columns of the first to eighteenth sub-pixels SP1 to SP18 therebetween.

Two rows of the first to eighteenth sub-pixels SP1 to SP18 have two of the first to sixth gate lines GL1 to GL6 disposed therebetween, and are connected to the corresponding TFTs from among the first to eighteenth TFTs T1 to T18 of the two rows of the first to eighteenth sub-pixels SP1 to SP18.

The first and third data lines DL1 and DL3 supply a data voltage having a first polarity without inverting the polarity during the generation of a frame image, and the second and fourth data lines DL2 and DL4 supply a data voltage having a second polarity opposite to the first polarity without inverting the polarity during the generation of an image frame. As a result, the LCD device according to the first embodiment is driven using a horizontal two-dot inversion method, thereby reducing power consumption.

Figure 3:
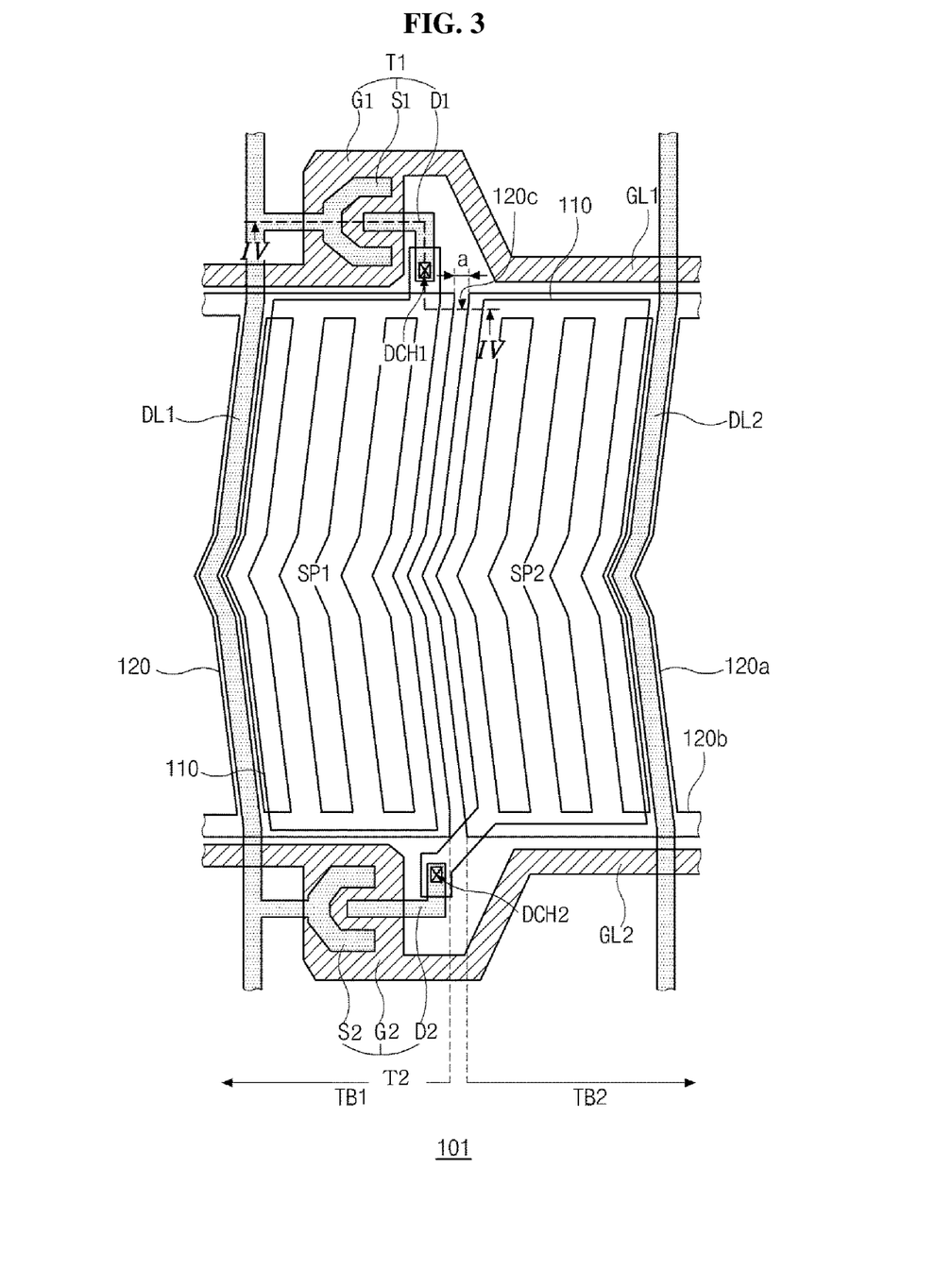
FIG. 3 is a magnified view of region A of FIG. 1, which corresponds to the first and second sub-pixels of FIG. 2.

FIG. 3 is a magnified view of region A of FIG. 1, which corresponds to the first and second sub-pixels of FIG. 2.

In FIG. 3, a plurality of touch blocks TB (of FIG. 1) of a substrate 101 include first and second touch blocks TB1 and TB2 adjacent to each other. The first and second touch blocks TB1 and TB2 include first and second sub-pixels SP1 and SP2, respectively, ad the first and second sub-pixels SP1 and SP2 face in the same direction.

First and second gate lines GL1 and GL2 are disposed at upper and lower portions, respectively, of the first and second sub-pixels SP1 and SP2, and first and second data lines DL1 and DL2 cross the first and second gate lines GL1 and GL2. First and second thin film transistors (TFTs) T1 and T2 are disposed in the first and second sub-pixels SP1 and SP2, respectively. A first electrode 110 is disposed in each of the first and second sub-pixels SP1 and SP2 and is connected to each of the first and second TFTs T1 and T2. A second electrode 120 is disposed in each of the first and second touch blocks TB1 and TB2 such that the second electrode 120 of the first touch block TB1 is separated from the second electrode 120 of the second touch block TB2.

The first TFT T1 is connected to the first gate line GL1 and the first data line DL1, and the second TFT T2 is connected to the second gate line GL2 and the first data line DLL A gate electrode G1 of the first TFT T1 is connected to the first gate line GL1, a source electrode S1 of the first TFT T1 is connected to the first data line DL1, and a drain electrode D1 of the first TFT T1 is connected to the first electrode 110 of the first sub-pixel SP1 through a drain contact hole DCH1. A gate electrode G2 of the second TFT T2 is connected to the second gate line GL2, a source electrode S2 of the second TFT T2 is connected to the first data line DL1, and a drain electrode D2 of the second TFT T2 is connected to the first electrode 110 of the second sub-pixel SP2 through a drain contact hole DCH2. Although not shown, a semiconductor layer is disposed over the gate electrodes G1 and G2 and under the source electrodes S1 and S2 and drain electrodes D1 and D2 in each of the first and second TFTs T1 and T2.

The first data line DL1 is at a left portion of the first sub-pixel SP1, and supplies a data voltage to the first sub-pixel SP1, which is close to the first data line DL1, and also supplies data voltage to the second sub-pixel SP2, which is disposed farther from the first data line DL1. In addition, the first data line DL1 supplies data voltage having the same polarity, but without inverting the polarity during the generation of a single image frame so that the LCD device can be driven using a horizontal two-dot inversion method.

The LCD device according to the first embodiment displays an image by applying a common voltage to the second electrode 120 during a display period and uses the second electrode 120 as a touch electrode for sensing a touch of a user during a non-display period.

The data voltage of the first data line DL1 is applied to the first electrode 110 through each of the first and second TFTs T1 and T2, and the common voltage of a common line (not shown) is applied to the second electrode 120. An electric field is generated by the data voltage of the first electrode 110 and the common voltage of the second electrode 120, and the liquid crystal molecules of a liquid crystal layer over the substrate 101 are rearranged by the electric field. As a result, transmittance of light emitted from a backlight unit (not shown) under the substrate 101 is adjusted to display an image.

The first and second electrodes 110 and 120 may include a transparent conductive material such as indium tin oxide (ITO) and indium zinc oxide (IZO) to transmit the light from the backlight unit. The first electrode 110 may have a plate shape. The second electrode 120 includes a finger part 120a, a connecting part 120b and an opening part 120c. The finger part 120a may have a shape of a plurality of bars overlapping the first electrode 110, the first data line DL1 and the second data line DL2. The connecting part 120b is connected to both ends of the finger part 120a. The opening part 120c separates the connecting part 120b between the first and second sub-pixels SP1 and SP2.

End portions of the finger part 120a may be bent symmetrically with respect to a central portion of each of the first and second sub-pixels SP1 and SP2 to have a first angle with respect to a vertical line. As a result, a single sub-pixel may include two domains with respect to the central portion of each sub-pixel, and the LCD device may have a uniform transmittance according to a viewing angle because the liquid crystal molecules of the two domains are rearranged according to electric fields having different directions.

In addition, a central portion of the finger part 120a may be bent symmetrically with respect to a central line of each of the first and second sub-pixels SP1 and SP2 to have a second angle greater than the first angle. Thus, light leakage in the central portion of each sub-pixel is prevented because both the difference in a direction where the response of the liquid crystal molecules and an area corresponding to a discontinuous domain are minimized. The first and second data lines DL1 and DL2 may be bent in the central portion of each sub-pixel similarly to the finger part 120a of the second electrode 120.

Although not shown, a touch line TL (of FIG. 1) is disposed parallel to each of the first and second data lines DL1 and DL2 in each of the first and second touch blocks TB1 and TB2. The touch line TL is connected to the second electrode 120 of each of the first and second touch blocks TB1 and TB2, and may include a conductive metallic material, such as aluminum (Al) and copper (Cu), to prevent a delay in receipt of a touch signal supplied by a sensing circuit (not shown). The touch line TL may have a single layer or multiple layers.

Figure 4:
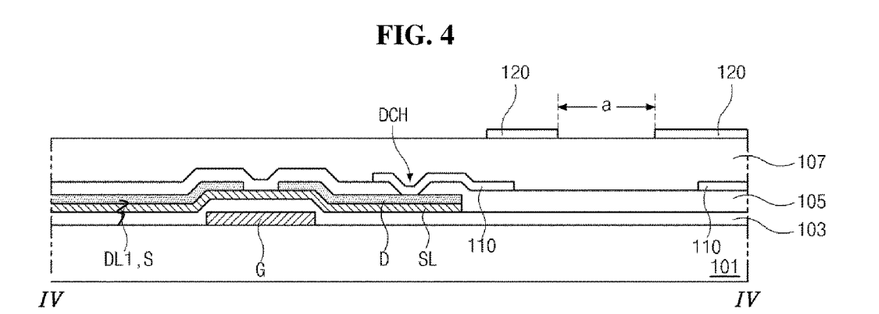
FIG. 4 is a cross-sectional view along line IV-IV of the liquid crystal display device illustrated in FIG. 3.

FIG. 4 is a cross-sectional view along line IV-IV of the liquid crystal display device illustrated in FIG. 3.

In FIG. 4, a gate electrode G is formed on a substrate 101, and a gate insulating layer 103 is formed on the gate electrode G. A semiconductor layer SL is formed on the gate insulating layer 103 corresponding to the gate electrode G, and a source electrode S and a drain electrode D are formed on the semiconductor layer SL. The source electrode S and a drain electrode D are spaced apart from each other. A first data line DL1 connected to the source electrode S is formed on the gate insulating layer 103.

An interlayer insulating layer 105 is formed on the source electrode S, the drain electrode D and the first data line DL1, and a first electrode 110 is formed on the interlayer insulating layer 105. The interlayer insulating layer 105 includes a drain contact hole DCH exposing the drain electrode D, and the first electrode 110 is connected to the drain electrode D through the drain contact hole DCH.

A planarizing layer 107 is formed on the first electrode 110, and a second electrode 120 is formed on the planarizing layer 107. The second electrode 120 of a first sub-pixel SP1 (of FIG. 3) and the second electrode 120 of a second sub-pixel SP2 (of FIG. 3) are separated from each other to form a gap region "a." In addition, the second electrode 120 partially overlaps the first electrode 110 such that the liquid crystal molecules are driven by an electric field generated between the first and second electrodes 110 and 120.

Although not shown, a passivation layer may be formed between the planarizing layer 107 and the second electrode 120. As a result, a touch line TL (of FIG. 1) may be formed on the planarizing layer 107, the passivation layer may be formed on the touch line TL, and the second electrode 120 may be formed on the passivation layer. The passivation layer may have a touch contact hole TCH (of FIG. 1) exposing the touch line TL, and the second electrode 120 may be connected to the touch line TL through the touch contact hole TCH.

Since the second electrode 120 has an opening part 120c corresponding to the gap region "a" between the first and second sub-pixels SP1 and SP2, light leakage may occur in this region. When one of the first and second touch blocks TB1 and TB2 is touched, a voltage difference is generated between the second electrode 120 of the touched one of the first and second touch blocks TB1 and TB2 and the second electrode 120 of the untouched one of the first and second touch blocks TB1 and TB2. Thus, light leakage may occur in the gap region "a" because the liquid crystal molecules between the first and second sub-pixels SP1 and SP2 are driven by an electric field due to the voltage difference even in a black state.

Figure 5:
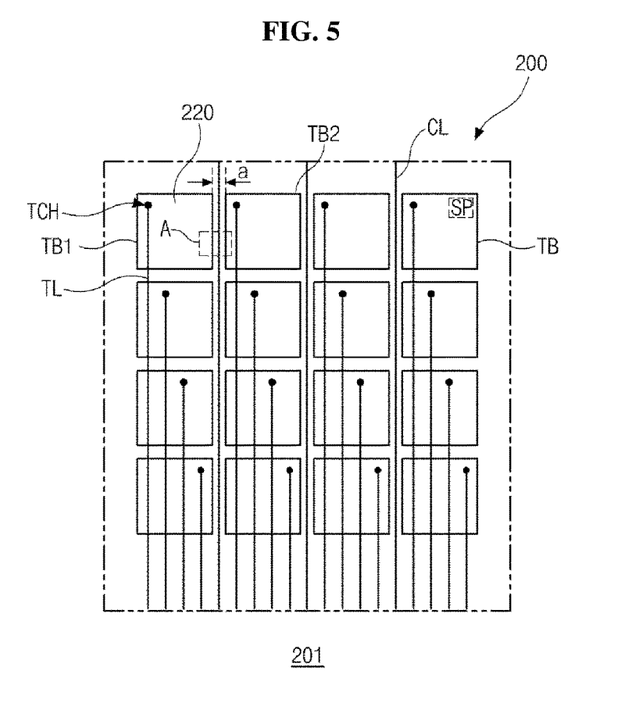
FIG. 5 is a plan view showing a liquid crystal display device according to a second embodiment of the present disclosure.

FIG. 5 is a plan view illustrating a liquid crystal display device according to a second embodiment of the present disclosure.

In FIG. 5, a liquid crystal display (LCD) device 200 includes a substrate 201 having a plurality of touch blocks TB, a second electrode 220 in each of the plurality of touch blocks TB and a plurality of touch lines TL disposed along a first direction. Each of the plurality of touch blocks TB includes a plurality of sub-pixels SP, and the plurality of touch lines TL are disposed under the second electrode 220.

One of the plurality of touch lines TL is connected to one second electrode 220 in each touch block TB, and a change in a capacitance of the second electrode 220 in each touch block TB is transmitted to a sensing circuit (not shown) through the plurality of touch lines TL. The one touch line TL is connected to the second electrode 220 in one touch block TB through a touch contact hole TCH and is not connected to the second electrode 220 in the other touch blocks.

Figure 6:
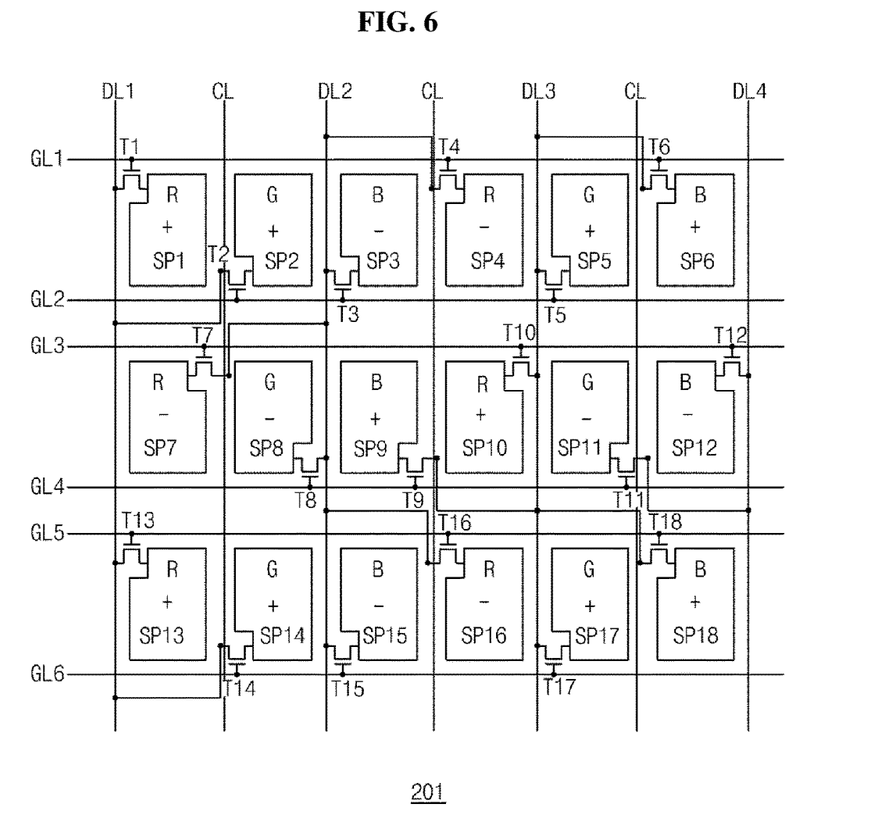
FIG. 6 is a circuit diagram illustrated the liquid crystal display device illustrated in FIG. 5.

FIG. 6 is a circuit diagram illustrating the circuitry of the liquid crystal display device illustrated in FIG. 5.

In FIG. 6, the liquid crystal display (LCD) device includes a substrate 201, first to eighteenth sub-pixels SP1 to SP18 arranged in three rows and six columns, first to sixth gate lines GL1 to GL6, first to fourth data lines DL1 to DL4, field blocking lines CL and first to eighteenth thin film transistors (TFTs) T1 to T18. The first to eighteenth sub-pixels SP1 to SP18 displays one of red, green and blue colors (R, G and B), and three adjacent sub-pixels displaying red, green and blue colors (R, G and B) constitute one unit pixel.

Although the first to eighteenth sub-pixels SP1 to SP18 are arranged in three rows and six columns in FIG. 6, the second embodiment is not limited thereto, and a plurality of sub-pixels may be arranged in any number of rows and columns.

The first and second gate lines GL1 and GL2 are disposed at upper and lower portions, respectively, of the first to sixth sub-pixels SP1 to SP6 in the first row, the third and fourth gate lines GL3 and GL4 are disposed at upper and lower portions, respectively, of the seventh to twelfth sub-pixels SP7 to SP12 in the second row, and the fifth and sixth gate lines GL5 and GL6 are disposed at upper and lower portions, respectively, of the thirteenth to eighteenth sub-pixels SP13 to SP18 in the third row.

The first to fourth data lines DL1 to DL4 cross the first to sixth gate lines GL1 to GL6. The first data line DL1 is disposed at a left portion of the first, seventh and thirteenth sub-pixels SP1, SP7 and SP13 in the first column, the second data line DL2 is disposed between the second, eighteenth and fourteenth sub-pixels SP2, SP8 and SP14 in the second column and the third, ninth and fifteenth sub-pixels SP3, SP9 and SP15 in the third column, the third data line DL3 is disposed between the fourth, tenth and sixteenth sub-pixels SP4, SP10 and SP16 in the fourth column and the fifth, eleventh and seventeenth sub-pixels SP5, SP11 and SP17 in the fifth column, and the fourth data line DL4 is disposed at a right portion of the sixth, twelfth and eighteenth sub-pixels SP6, SP12 and SP18 in the sixth column.

The field blocking lines CL are disposed between sub-pixels where the first to fourth data lines DL1 to DL4 are not disposed and each filed blocking line crosses the first to sixth gate lines GL1 to GL6. The field blocking lines CL may have the same number of layers and may be of the same material as the first to fourth data lines DL1 to DL4.

Two columns of the first to eighteenth sub-pixels SP1 to SP18 are disposed between two of the first to fourth data lines DL1 to DL4, and the two of the first to fourth data lines DL1 to DL4 are alternately connected to two of the first to eighteenth TFTs T1 to T18 of the corresponding two columns of the first to eighteenth sub-pixels SP1 to SP18 therebetween. As a result, the two of the first to fourth data lines DL1 to DL4 are connected in a zigzag pattern along the two columns of the first to eighteenth sub-pixels SP1 to SP18 therebetween.

Two of the first to sixth gate lines GL1 to GL6 are disposed between two rows of the first to eighteenth sub-pixels SP1 to SP18 and are connected to the first to eighteenth TFTs T1 to T18 of the two rows of the first to eighteenth sub-pixels SP1 to SP18.

The first and third data lines DL1 and DL3 supply a data voltage having a first polarity without inverting the polarity during the generation of an image frame, and the second and fourth data lines DL2 and DL4 supply a data voltage having a second polarity opposite to the first polarity, but without inverting the polarity during the generation of an image frame. As a result, the LCD device according to the second embodiment is driven using a horizontal two-dot inversion method, and power consumption thereof is reduced.

The field blocking lines CL supply a voltage different from the data voltage supplied by the first to fourth data lines DL1 to DL4. For example, the field blocking lines CL may supply a common voltage.

Figure 7:
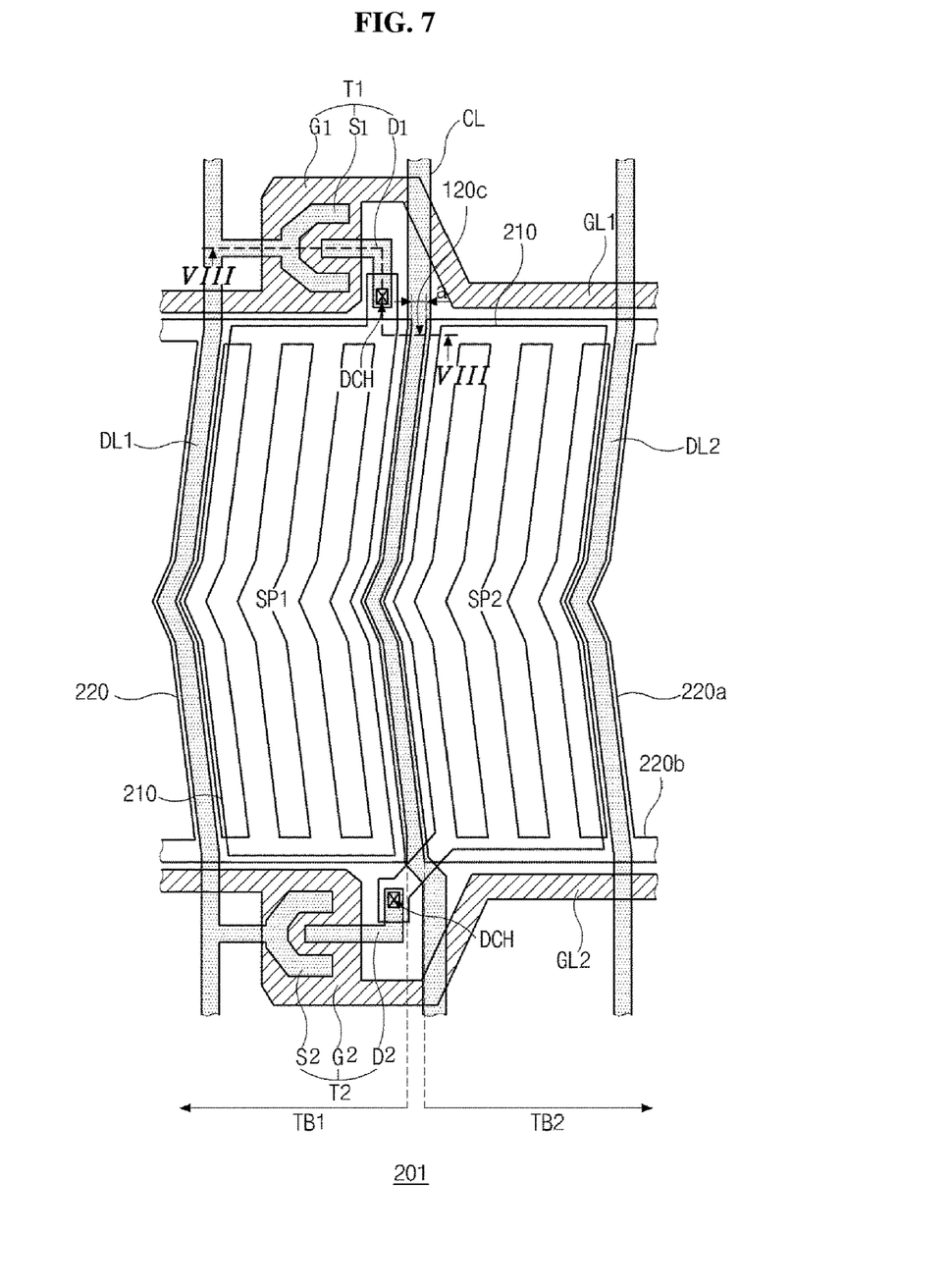
FIG. 7 is a magnified view of region A of FIG. 5, which corresponds to the first and second sub-pixels of FIG. 6.

FIG. 7 is a magnified view of region A of FIG. 5, which corresponds to the first and second sub-pixels of FIG. 6.

In FIG. 7, a plurality of touch blocks TB (of FIG. 5) of a substrate 201 include first and second touch blocks TB1 and TB2 adjacent to each other. The first and second touch blocks TB1 and TB2 include first and second sub-pixels SP1 and SP2, respectively. The first and second sub-pixels SP1 and SP2 face in the same direction.

First and second gate lines GL1 and GL2 are disposed at upper and lower portions, respectively, of the first and second sub-pixels SP1 and SP2, and first and second data lines DL1 and DL2 cross the first and second gate lines GL1 and GL2. First and second thin film transistors (TFTs) T1 and T2 are disposed in the first and second sub-pixels SP1 and SP2, respectively. A first electrode 210 is disposed in each of the first and second sub-pixels SP1 and SP2 and is connected to each of the first and second TFTs T1 and T2. A second electrode 220 is disposed in each of the first and second touch blocks TB1 and TB2 such that the second electrode 220 of the first touch block TB1 is separated from the second electrode 220 of the second touch block TB2 by a gap region "a".

The first TFT T1 is connected to the first gate line GL1 and the first data line DL1, and the second TFT T2 is connected to the second gate line GL2 and the first data line DLL A gate electrode G1 of the first TFT T1 is connected to the first gate line GL1, a source electrode S1 of the first TFT T1 is connected to the first data line DL1, and a drain electrode D1 of the first TFT T1 is connected to the first electrode 210 of the first sub-pixel SP1 through a drain contact hole DCH1. A gate electrode G2 of the second TFT T2 is connected to the second gate line GL2, a source electrode S2 of the second TFT T2 is connected to the first data line DL1, and a drain electrode D2 of the second TFT T2 is connected to the first electrode 210 of the second sub-pixel SP2 through a drain contact hole DCH2. Although not shown, a semiconductor layer is disposed over the gate electrodes G1 and G2 and under the source electrodes S1 and S2 and drain electrodes D1 and D2 in each of the first and second TFTs T1 and T2.

The first data line DL1 is at a left portion of the first sub-pixel SP1, and supplies data voltage to the first sub-pixel SP1, which is close to the first data line DL1, and also supplies data voltage to the second sub-pixel SP2, which is located farther away from the first data line DL1. In addition, the first data line DL1 supplies data voltage having the same polarity, and without inverting the polarity, during the generation of one image frame so that the LCD device can be driven using a horizontal two-dot inversion method.

The LCD device according to the second embodiment displays an image by applying a common voltage to the second electrode 220 during a display period and uses the second electrode 220 as a touch electrode for sensing a touch of a user during a non-display period.

The data voltage of the first data line DL1 is applied to the first electrode 210 through each of the first and second TFTs T1 and T2, and the common voltage of a common line (not shown) is applied to the second electrode 220. An electric field is generated by the data voltage of the first electrode 210 and the common voltage of the second electrode 220, and the liquid crystal molecules of a liquid crystal layer over the substrate 201 are rearranged by the electric field. As a result, transmittance of light emitted from a backlight unit (not shown) under the substrate 201 is adjusted to display an image.

The first and second electrodes 210 and 220 may include a transparent conductive material such as indium tin oxide (ITO) and indium zinc oxide (IZO) to transmit light from the backlight unit. The first electrode 210 may have a plate shape. The second electrode 220 includes a finger part 220a, a connecting part 220b and an opening part 220c. The finger part 220a may have a shape of a plurality of bars overlapping the first electrode 210, the first data line DL1 and the second data line DL2. The connecting part 220b is connected to both ends of the finger part 220a. The opening part 220c corresponds to the gap region "a," and separates the connecting part 220b between the first and second sub-pixels SP1 and SP2.

End portions of the finger part 220a may be bent symmetrically with respect to a central portion of each of the first and second sub-pixels SP1 and SP2 to have a first angle with respect to a vertical line. As a result, a single sub-pixel may include two domains with respect to the central portion of each sub-pixel, and the LCD device may have a uniform transmittance according to a viewing angle because the liquid crystal molecules of the two domains are rearranged according to electric fields oriented different directions.

In addition, a central portion of the finger part 220a may be bent symmetrically with respect to a central line of each of the first and second sub-pixels SP1 and SP2 to have a second angle greater than the first angle. Thus, light leakage in the central portion of each sub-pixel may be prevented because both the difference in direction where the liquid crystal molecules response and an area corresponding to a discontinuous domain are minimized. The first and second data lines DL1 and DL2 may be bent in the central portion of each sub-pixel in a manner similar to the finger part 220a of the second electrode 220.

Although not shown, a touch line TL (of FIG. 5) is disposed parallel to each of the first and second data lines DL1 and DL2 in each of the first and second touch blocks TB1 and TB2. The touch line TL is connected to the second electrode 220 of each of the first and second touch blocks TB1 and TB2. The touch line TL may include a conductive metallic material such as aluminum (Al) and copper (Cu) for preventing a delay of a touch signal supplied by a sensing circuit (not shown) and may have a single layer or multiple layers.

As illustrated in FIG. 7, the field blocking line CL crossing the first and second gate lines GL1 and GL2 is disposed between the first and second sub-pixels SP1 and SP2 to prevent light leakage in the gap region "a" between the first and second sub-pixels SP1 and SP2. The field blocking line CL supplies a voltage different from the data voltage supplied by the first and second data lines DL1 and DL2. For example, the field blocking line CL may supply a voltage having the same value as the voltage (e.g., a common voltage) supplied to the second electrode 220.

In addition, the field blocking line CL may have a predetermined width to overlap the connecting part 220b of the second electrode 220 of the first and second sub-pixels SP1 and SP2. As a result, the field blocking line CL may cover the opening part 230c of the second electrode 220 such that the second electrode 220 of the first and second sub-pixels SP1 and SP2 may be connected when observed in a plan view.

An electric field generated between the second electrode 220 of the sub-pixel of a touched touch block TB and the second electrode 220 of the sub-pixel of an untouched touch block TB is blocked and shielded because the field blocking line CL supplies a voltage having the same value as the voltage supplied to the second electrode 220. As a result, the liquid crystal molecules of the liquid crystal layer between the first and second sub-pixels SP1 and SP2 are not driven by the electric field in a black state, and light leakage in the gap region "a" between the first and second touch blocks TB1 and TB2 is prevented.

Further, the data line is not disposed between the two sub-pixels because the LCD device according to the second embodiment has a double rate driving (DRD) where the data voltage is supplied to two sub-pixels through one data line. As a result, the field blocking line CL may be formed between the first and second sub-pixels SP1 and SP2 with the same layer and the same material as the first and second data lines DL1 and DL2.

Figure 8:
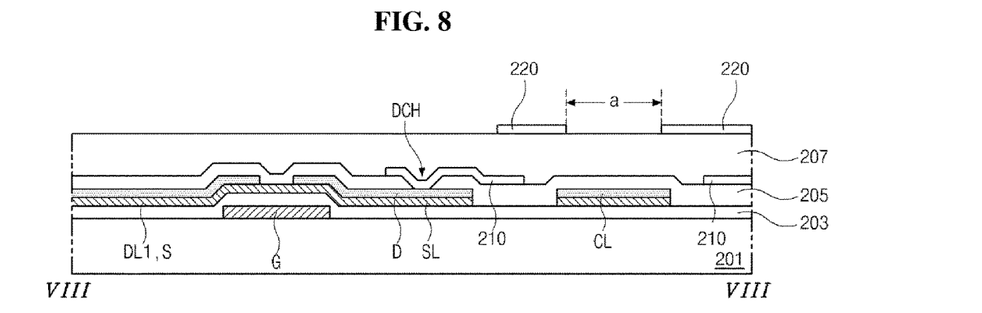
FIG. 8 is a cross-sectional view along line VIII-VIII of the liquid crystal display device illustrated in FIG. 7.

FIG. 8 is a cross-sectional view along a line VIII-VIII of the liquid crystal display device illustrated in FIG. 7.

In FIG. 8, a gate electrode G is formed on a substrate 201, and a gate insulating layer 203 is formed on the gate electrode G. A semiconductor layer SL is formed on the gate insulating layer 203 corresponding to the gate electrode G, and a source electrode S and a drain electrode D are formed on the semiconductor layer SL. The source electrode S and a drain electrode D are spaced apart from each other. A first data line DL1 and a field blocking line CL are formed on the semiconductor layer SL. The first data line DL1 is connected to the source electrode S. In addition, the position of the field blocking line CL corresponds to the gap region "a" between first and second sub-pixels SP1 and SP2 (of FIG. 7) and may include the same number of layers and may be of the same material as the first data line DL1.

An interlayer insulating layer 205 is formed on the source electrode S, the drain electrode D, the first data line DL1 and the field blocking line CL, and a first electrode 210 is formed on the interlayer insulating layer 205. The interlayer insulating layer 205 includes a drain contact hole DCH exposing the drain electrode D, and the first electrode 210 is connected to the drain electrode D through the drain contact hole DCH.

A planarizing layer 207 is formed on the first electrode 210, and a second electrode 220 is formed on the planarizing layer 207. The second electrode 220 of the first sub-pixel SP1 and the second electrode 220 of the second sub-pixel SP2 are separated from each other to form the gap region "a." In addition, the second electrode 220 partially overlaps the first electrode 210 such that the liquid crystal molecules of the liquid crystal layer are driven by an electric field generated between the first and second electrodes 210 and 220.

Although not shown, a passivation layer may be formed between the planarizing layer 207 and the second electrode 220. As a result, a touch line TL (of FIG. 5) may be formed on the planarizing layer 207, the passivation layer may be formed on the touch line TL, and the second electrode 220 may be formed on the passivation layer. The passivation layer may have a touch contact hole TCH (of FIG. 5) exposing the touch line TL, and the second electrode 220 may be connected to the touch line TL through the touch contact hole TCH.

Since the field blocking line CL is disposed to overlap the second electrode 220 of the first and second sub-pixels SP1 and SP2, the field blocking line CL completely covers the gap region "a" between the first and second sub-pixels SP1 and SP2. In addition, since a voltage having the same value as the voltage (e.g., a common voltage) supplied to the second electrode 220 is applied to the field blocking line CL, an electric field due to a voltage difference between the second electrode 220 of a touched touch block TB and the second electrode 220 of an untouched touch block TB is blocked and shielded by an electric field due to the voltage of the field blocking line CL. As a result, light leakage at the gap region "a" between the first and second sub-pixels SP1 and SP2 is prevented.

In the liquid crystal display device according to the present disclosure, because the field blocking line is disposed in the border region between the touch blocks, the liquid crystal molecules in the border region between the touch blocks are not driven. As a result, light leakage in the border region between the touch blocks is prevented and the display quality of the liquid crystal display device is improved.

A number of examples have been described above. Nevertheless, it will be understood that the present disclosure is not limited thereto, and various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device comprising:
a substrate including first and second touch blocks adjacent to each other, the first and second touch blocks including first and second sub-pixels;
a first electrode in each of the first and second sub-pixels;
a second electrode in each of the first and second touch blocks, wherein the second electrode of the first touch block and the second electrode of the second touch block are separated from each other; and
first and second data lines disposed at side portions of the first and second sub-pixels,
wherein the first and second sub-pixels are disposed between the first and second data lines, and a field blocking line is disposed between the first and second sub-pixels.

2. The device of claim 1, wherein a voltage applied to the field blocking line is different from a voltage applied to the first and second data lines.

3. The device of claim 1, wherein a voltage applied to the field blocking line is a same as a voltage applied to the second electrode.

4. The device of claim 1, wherein the field blocking line is formed in a same layer as the first and second data lines.

5. The device of claim 1, wherein the second electrode comprises:
a finger part having a shape of a plurality of bars and overlapping with the first electrode;
a connecting part connected to both ends of the finger part; and
an opening part separating the connecting part between the first and second sub-pixels.

6. The device of claim 5, wherein the field blocking line overlaps with the opening part of the second electrode.

7. The device of claim 5, wherein the second electrodes of the first and second sub-pixels are connected.

8. The device of claim 5, wherein the field blocking line overlaps with the connecting part of the second electrode.

9. The device of claim 1, further comprising a touch line parallel to the first and second data lines and disposed in each of the first and second touch blocks.

10. The device of claim 9, wherein the touch line is electrically connected to the second electrode.

11. The device of claim 1, wherein a common voltage is applied to the second electrode during a display period such that an image is displayed.

12. The device of claim 1, wherein the second electrode is used as a touch electrode during a non-display period such that a touch is sensed.

13. The device of claim 1, further comprising first and second thin film transistors disposed in the first and second sub-pixels, respectively.

14. The device of claim 13, wherein a drain electrode of the first thin film transistor is connected to the first electrode of the first sub-pixel through a first drain contact hole, and a drain electrode of the second thin film transistor is connected to the first electrode of the second sub-pixel through a second drain contact hole.

15. The device of claim 1, wherein the first data line is disposed at a first side of the first sub-pixel, the field blocking line is disposed at a second side of the first sub-pixel and a first side of the second sub-pixel, and the second data line is disposed at a second side of the second sub-pixel.

16. The device of claim 10, further comprising:
an interlayer insulating layer on the first and second data lines and the field blocking line;
a planarizing layer on the first electrode;
a passivation layer on the touch line,
wherein the first electrode is disposed on the interlayer insulating layer,
wherein the touch line is disposed on the planarizing layer, and
wherein the second electrode is disposed on the passivation layer.

17. The device of claim 1, wherein a data voltage of the first data line is applied to the first electrode.

18. The device of claim 17, wherein a common voltage of a common line is applied to the second electrode.

19. The device of claim 1, wherein the first electrode is a pixel electrode connected to a drain electrode of a thin film transistor.

20. The device of claim 19, wherein the second electrode is a touch electrode sensing a touch.

* * * * *